United States Patent
Held

(10) Patent No.: US 10,883,388 B2
(45) Date of Patent: *Jan. 5, 2021

(54) SYSTEMS AND METHODS FOR GENERATING ELECTRICITY VIA A PUMPED THERMAL ENERGY STORAGE SYSTEM

(71) Applicant: ECHOGEN POWER SYSTEMS LLC, Akron, OH (US)

(72) Inventor: Timothy Held, Akron, OH (US)

(73) Assignee: ECHOGEN POWER SYSTEMS LLC, Akron, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/453,723

(22) Filed: Jun. 26, 2019

(65) Prior Publication Data

US 2020/0003080 A1 Jan. 2, 2020

Related U.S. Application Data

(60) Provisional application No. 62/690,803, filed on Jun. 27, 2018.

(51) Int. Cl.
| | |
|---|---|
| F01K 3/12 | (2006.01) |
| F01K 3/08 | (2006.01) |
| F01K 7/16 | (2006.01) |
| F01K 19/00 | (2006.01) |
| F28D 17/04 | (2006.01) |
| F01K 13/00 | (2006.01) |

(Continued)

(52) U.S. Cl.
CPC .......... *F01K 3/12* (2013.01); *F01K 3/08* (2013.01); *F01K 7/165* (2013.01); *F01K 7/38* (2013.01); *F01K 13/00* (2013.01); *F01K 19/00* (2013.01); *F01K 23/02* (2013.01); *F28D 17/04* (2013.01); *F28D 2020/006* (2013.01)

(58) Field of Classification Search
CPC ... F01K 3/12; F01K 3/08; F01K 7/165; F01K 7/38; F01K 13/00; F01K 19/00; F01K 23/02; F28D 17/04
See application file for complete search history.

(56) References Cited

U.S. PATENT DOCUMENTS

| | | | |
|---|---|---|---|
| 9,038,390 B1 * | 5/2015 | Kreuger | F01K 23/02 60/655 |
| 2012/0067046 A1 * | 3/2012 | Drenik | B01D 1/0058 60/645 |

(Continued)

*Primary Examiner* — Viet P Nguyen
(74) *Attorney, Agent, or Firm* — Nolte Lackenbach & Siegel

(57) ABSTRACT

Systems and methods are provided for generating electricity via a pumped thermal energy storage ("PTES") system. A system may include a pump configured to circulate a working fluid within a fluid circuit, wherein the working fluid enters the pump at a first pressure and exits at a second pressure; a first heat exchanger; a second heat exchanger; a turbine positioned between the first heat exchanger and the second heat exchanger, configured to expand a first portion of the working fluid to the first pressure; a heat rejection heat exchanger configured to remove thermal energy from a second portion of the working fluid; a high temperature reservoir connected to the first heat exchanger; and a low temperature reservoir connected to the second heat exchanger.

22 Claims, 8 Drawing Sheets

(51) Int. Cl.
*F01K 7/38* (2006.01)
*F01K 23/02* (2006.01)
*F28D 20/00* (2006.01)

(56) References Cited

U.S. PATENT DOCUMENTS

| | | | |
|---|---|---|---|
| 2013/0087301 A1* | 4/2013 | Hemrle | F01K 3/12 |
| | | | 165/4 |
| 2015/0069758 A1* | 3/2015 | Davidson | F01K 25/10 |
| | | | 290/52 |
| 2017/0058202 A1* | 3/2017 | Noureldin | C10B 57/045 |
| 2017/0350658 A1* | 12/2017 | Kerth | F28D 17/005 |
| 2018/0187628 A1* | 7/2018 | Apte | F28D 20/0056 |
| 2018/0340712 A1* | 11/2018 | Peter | F28D 20/02 |
| 2019/0170026 A1* | 6/2019 | Matsukuma | F01K 3/12 |
| 2020/0003081 A1* | 1/2020 | Held | F01K 7/16 |

* cited by examiner

SYSTEMS AND METHODS FOR GENERATING ELECTRICITY VIA A PUMPED THERMAL ENERGY STORAGE SYSTEM

CROSS-REFERENCE TO RELATED APPLICATIONS

This application claims the benefit of U.S. Prov. Appl. No. 62/690,803, filed Jun. 27, 2018. This application is incorporated herein by reference in its entirety to the extent consistent with the present application.

BACKGROUND

Pumped thermal energy storage ("PTES") systems, also known as electro-thermal energy storage systems, are used to store and generate energy. PTES systems generally consist of a configurable thermodynamic cycle where thermal energy is transferred between a high temperature reservoir and a low temperature reservoir via working fluid in a working fluid circuit.

During a "charging" cycle of operation, the thermodynamic cycle, which is a heat pump cycle in a nominally forward direction, may be used to increase the thermal energy in the high temperature reservoir. In some instances, an electrical motor may be used to drive a compressor, which increases the pressure and temperature of the working fluid, whereby the thermal energy in the fluid is transferred to and stored in the high temperature reservoir by using a high temperature heat exchanger. Following the heat transfer to the high temperature reservoir, the fluid may be expanded through a turbine, which produces shaft work that may be used to drive the gas compressor. This working fluid expansion may lower the pressure and temperature of the working fluid. After exiting the turbine, the working fluid may pass through a low temperature heat exchanger that is connected to a low temperature reservoir and may affect transfer of heat from the low temperature reservoir to the working fluid. Upon exit from the low temperature heat exchanger, the working fluid may be returned to its approximate initial state (i.e., pressure and temperature).

During a "generating" cycle of operation, the direction of fluid and heat flows is reversed. A pump may increase the pressure of the working fluid and move the working fluid through the high temperature heat exchanger, which transfers heat from the high temperature reservoir to the working fluid. The heated working fluid may be expanded by a turbine, producing shaft work. The shaft work from the turbine may exceed the compressor work, and the excess work may be converted to electrical power by a generator and distributed to an electrical grid electrically coupled to the generator. Following the turbine expansion, the working fluid may be cooled by passing through the low temperature heat exchanger that is connected to a low temperature reservoir before entering the pump. Upon exit of the low temperature heat exchanger, the working fluid may be returned to its approximate initial state (i.e., pressure and temperature).

One metric used to determine performance of a PTES system is round trip efficiency ("RTE"). Round trip efficiency is defined as the amount of electrical energy that may be produced during the generating cycle divided by the amount of electrical energy that was consumed during the charging cycle. Due to thermodynamic irreversibilities, pressure losses, and finite temperature approaches through the heat exchangers, the RTE values of PTES systems, as described above, are generally calculated at around 55-56%. Therefore, there is a need for an improved PTES system and method that results in a higher RTE, and greater electricity generation.

SUMMARY

A generation system in a PTES may include a fluid circuit configured to flow a working fluid therethrough, the working fluid may include a first portion and a second portion comingled together, the fluid circuit may include: a pump configured to circulate the working fluid within the fluid circuit, wherein the working fluid may enter the pump at a first pressure, and the working fluid may exit the pump at a second pressure; a first heat exchanger through which the working fluid circulates in use; a second heat exchanger through which the working fluid circulates in use; a turbine positioned between the first heat exchanger and the second heat exchanger, the turbine configured to expand the working fluid to a third pressure, the third pressure may be greater than the first pressure and less than the second pressure; a separation location where the working fluid may be separated into the first portion and the second portion; an auxiliary line through which the second portion of the working fluid may circulate between the turbine and the first heat exchanger; a heat rejection heat exchanger positioned between an outlet of the turbine and an inlet of the first heat exchanger, and in fluid communication with the auxiliary line, wherein the heat rejection heat exchanger may be configured to remove thermal energy from a second portion of the working fluid; a high temperature reservoir may be connected to the first heat exchanger and may be configured to transfer thermal energy to and from the working fluid; and a low temperature reservoir may be connected to the second heat exchanger and may be configured to transfer thermal energy to and from the working fluid. The turbine within the generation system may be a first turbine and the generation system may include a second turbine; wherein the first turbine may be configured to expand the working fluid to a third pressure, the third pressure greater than the first pressure and less than the second pressure; wherein the second turbine may be configured to expand the first portion of the working fluid to the first pressure; and wherein the heat rejection heat exchanger may be positioned between an outlet of the first turbine and an inlet of the first heat exchanger. The auxiliary line may be configured to remove thermal energy from the second portion of the working fluid and increase a pressure of the second portion of the working fluid.

A method for generating electricity in a PTES, may include: circulating a working fluid, that may include a first portion and a second portion comingled together, through a fluid circuit via a first pump, wherein the working fluid enters the pump at a first pressure and exits the pump at a second pressure, the second pressure greater than the first pressure; circulating the working fluid through a first heat exchanger fluidly connected to the pump within the fluid circuit; expanding the working fluid to a third pressure via a turbine positioned in the fluid circuit between the first heat exchanger and a second heat exchanger, the third pressure greater than the first pressure and less than the second pressure; separating the working fluid into the first portion and the second portion after expansion to the third pressure; expanding the first portion of the working fluid via the turbine to the first pressure; circulating the second portion of the working fluid through an auxiliary line fluidly connected to and part of the fluid circuit, wherein the auxiliary line comprises a heat rejection heat exchanger configured to reduce the thermal energy of the second portion of the working fluid; circulating the second portion of the working fluid within the auxiliary line through a second pump, fluidly connected to and part of the auxiliary line, configured to increase the pressure of the second portion of the working fluid to the second pressure; circulating the first portion of the working fluid through the second heat exchanger fluidly connected within the working fluid circuit; and combining the second portion with the first portion between the first pump and the first heat exchanger.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
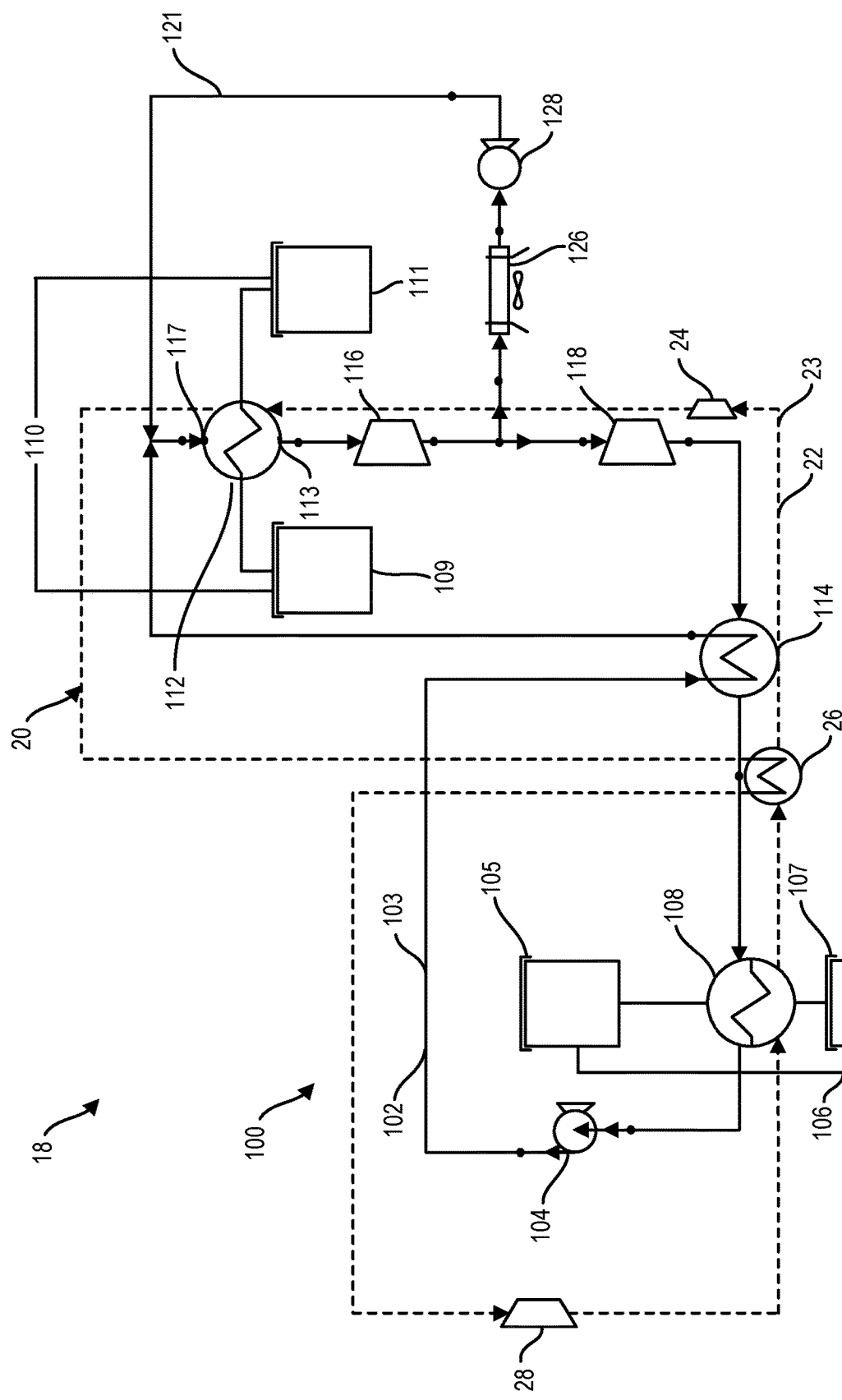
FIG. 1 is a schematic of a pumped thermal energy storage ("PTES") system, according to one or more embodiments disclosed.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

The following disclosure is directed to improved pumped thermal energy storage ("PTES") systems that may result in an increased round trip efficiency ("RTE"). As will be discussed in more detail herein, during the generating cycle, the PTES system may include two turbine expansion processes. Working fluid may be split into a first portion and a second portion after exiting a first heat exchanger that is connected to a high temperature reservoir. The first portion of the working fluid may be expanded to a first pressure and proceed through a second heat exchanger connected to a low temperature reservoir. The first portion may then flow through a pump where it is repressurized to a second pressure before returning to the first heat exchanger. A second portion of the working fluid may be expanded to a third pressure, where the third pressure is greater than the first pressure and less than the second pressure. The second portion may enter an auxiliary line which removes excess thermal energy from the second portion of the working fluid and may release the thermal energy to the environment. The second portion of the working fluid may be in a high-density state because of the third pressure and the resultant low temperature. A reduced amount of work may be required to increase the pressure of the second portion of working fluid to the second pressure. This configuration may result in a higher recovery of enthalpy for the PTES system, which may result in an improved RTE, and may generate more electricity as compared to other PTES systems.

FIG. 1 is a schematic of a PTES system 18, according to one or more embodiments disclosed herein. The PTES system 18 may use a thermodynamic cycle to generate electrical power. The PTES system 18 may include a charging system 20 and a generating system 100.

Figure 2:
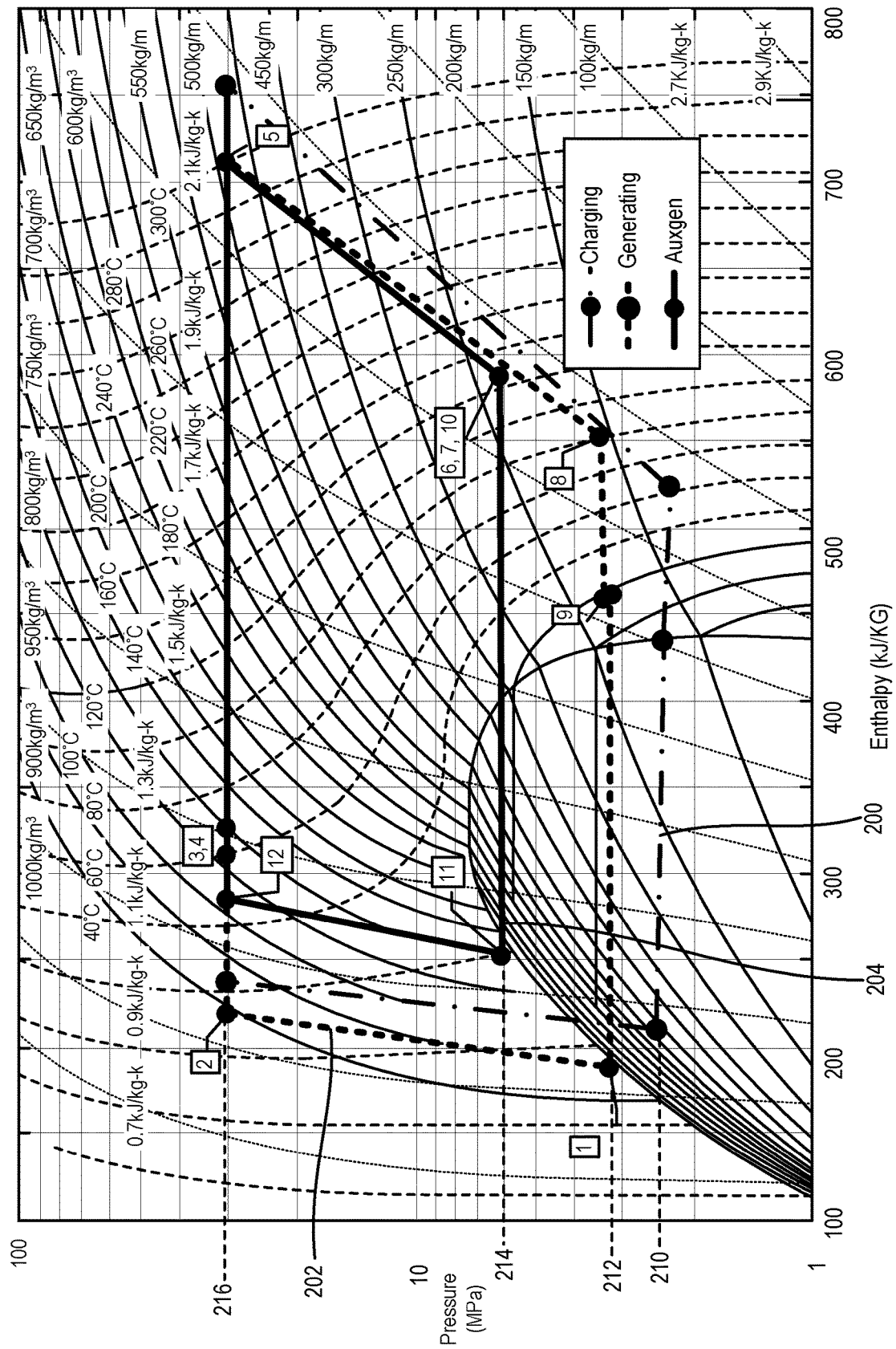
FIG. 2 is a pressure enthalpy diagram of the PTES system shown in FIG. 1, according to one or more embodiments disclosed.

FIG. 2 is a pressure enthalpy diagram of the PTES system 18 shown in FIG. 1, according to one or more embodiments disclosed. The generating system 100 may circulate a first working fluid 102 in a first fluid circuit 103 during a generating cycle 202 of the PTES system 18, and the charging system 20 may circulate a second working fluid 22 in a second fluid circuit 23 during a charging cycle 200 of the PTES system 18. Each of these cycles 200 and 202 are reflected in the pressure-enthalpy diagram of FIG. 2 and will be discussed herein below. It should be understood that the first fluid circuit 103 and the second fluid circuit 23 may be combined into and operate as a single fluid circuit, not shown.

Returning to FIG. 1, the first and second working fluids 102 and 22 may be the same fluid or may be different fluids. The first and second working fluids 102 and 22 may flow through the first fluid circuit 103 and/or the second fluid circuit 23. The first and second working fluids 102 and 22 of the generating system 100 and the charging system 20, respectively, may be or include carbon dioxide ($CO_2$), ammonia, water, propane, butane, pentane, r245fa, or other fluids suitable for use in the generating system 100 and/or the charging system 20. The first and second fluid circuits 103 and 23 may be closed. The PTES system 18 may use either the charging system 20 or the generating system 100 at a given time. The PTES system 18 may use the charging system 20 and the generating system 100 at the same time.

The PTES system 18 may include a first heat exchanger 112 and a second heat exchanger 108 that may be fluidly connected to the first fluid circuit 103 and the second fluid circuit 23. Both the charging system 20 and the generating system 100 may utilize the first heat exchanger 112 and the second heat exchanger 108 to facilitate the transfer of thermal energy to and from their respective working fluids, first working fluid 102 and second working fluid 22.

The first heat exchanger 112 may be fluidly connected to a high temperature reservoir 110, and the second heat exchanger 108 may be fluidly connected to a low temperature reservoir 106. The high temperature reservoir 110 may include a first material that has a higher temperature than a second material that may be included in the low temperature reservoir 106. The high temperature reservoir 110, which may include the first material that may be utilized by the first heat exchanger 112, may transfer thermal energy to and from the first working fluid 102 and the second working fluid 22 of the PTES system 18. The first material may be or include thermal oil, molten salt, water, particulate such as sand or gravel, concrete, encapsulated phase-change materials, bulk phase-change materials, a combination therein, or any other material suitable for use in a high temperature reservoir.

The high temperature reservoir 110 may include a plurality of vessels, for example, a first high temperature vessel 109 and a second high temperature vessel 111 that may be in fluid communication with one another. However, the high temperature reservoir 110 may be a single vessel or three or more vessels in other embodiments. The first material may circulate between the first high temperature vessel 109 and the second high temperature vessel 110. The first material may be at a first high temperature in the first high temperature vessel 109 and at a second high temperature in the second high temperature vessel 110. The first high temperature may be higher than the second high temperature and vice-versa. The first material may circulate through the first heat exchanger 112 to transfer thermal energy to and from the first working fluid 102 and the second working fluid 22 of the PTES system 18. The first heat exchanger 112 may be a conventional heat exchanger, a printed circuit heat exchanger, a moving bed heat exchanger, a fluidized bed heat exchanger, or a packed bed thermocline.

Similarly, the low temperature reservoir 106, which may include the second material that may be utilized by the second heat exchanger 108, may transfer thermal energy to and from the first working fluid 102 and the second working fluid 22 in the PTES system 18. The second material may be or include water, glycol, ice, seawater, ethanol, low-temperature thermal oil, hydrocarbon fluid, a combination thereof, or any other material suitable for use in a low temperature reservoir.

The low temperature reservoir 106 may include a plurality of vessels, for example, a first low temperature vessel 105 and a second low temperature vessel 107 that may be in fluid communication with one another. However, the low temperature reservoir 106 may be a single vessel or three or more vessels in other embodiments. The second material may circulate between the first low temperature vessel 105 and the second low temperature vessel 107. The second material may be at a first low temperature in the first low temperature vessel 105 and at a second low temperature in the second low temperature vessel 107. The first low temperature may be higher than the second low temperature and vice-versa. The second material may circulate through the second heat exchanger 108 to transfer thermal energy to and from the first working fluid 102 and the second working fluid 22 of the PTES system 18.

Referring to FIG. 1 and FIG. 2, during the charging cycle 200 of operation, as depicted with the dashed lines in FIG. 1, the PTES system 18 may use the charging system 20 to transfer thermal energy to the high temperature reservoir 110 by utilizing a heat pump cycle. The charging system 20 may include a compressor 24 and a turbine 28 fluidly connected to the first heat exchanger 112 and the second heat exchanger 108. The compressor 24 may be a compressor driven by an electrical motor. The compressor 24 and/or the turbine 28 may circulate the second working fluid 22 through the charging system 20. One or more pumps, compressors, or turbines, not shown, may be incorporated to circulate the second working fluid 22 through the charging system 20.

The second working fluid 22 of the charging system 20 may enter the compressor 24 at a low temperature and a low-pressure state and exit the compressor 24 at a high temperature and high-pressure state before flowing into the first heat exchanger 112. In the first heat exchanger 112, thermal energy may pass from the second working fluid 22 into the first material of the high temperature reservoir 110 where the thermal energy may be stored. The second working fluid 22 may therefore exit the first heat exchanger 112 at a lower temperature and may flow into a recuperator 26 where additional thermal energy is transferred to and from the second working fluid 22. The recuperator 26 may be positioned between the second heat exchanger 108 and the compressor 24, and in fluid communication therein. The recuperator 26 may be omitted from the charging system 20. The turbine 28 may be positioned between the recuperator 26 and the second heat exchanger 108.

After flowing through the recuperator 26, the second working fluid 22 may be expanded in the turbine 28 to return the second working fluid 22 to a low pressure. In embodiments, a positive displacement expander, an expansion valve, or a fluid orifice may be used in conjunction or in place of the turbine 28 to expand the second working fluid 22.

The pressure of the second working fluid 22 upon exit from the turbine 28 may be substantially the same as the low pressure at the inlet of the compressor 24. Accordingly, during the charging cycle 200 of operation, the PTES system 18 may expend electrical energy to charge or provide thermal energy to the high temperature reservoir 110 via a heat pump cycle.

Figure 3:
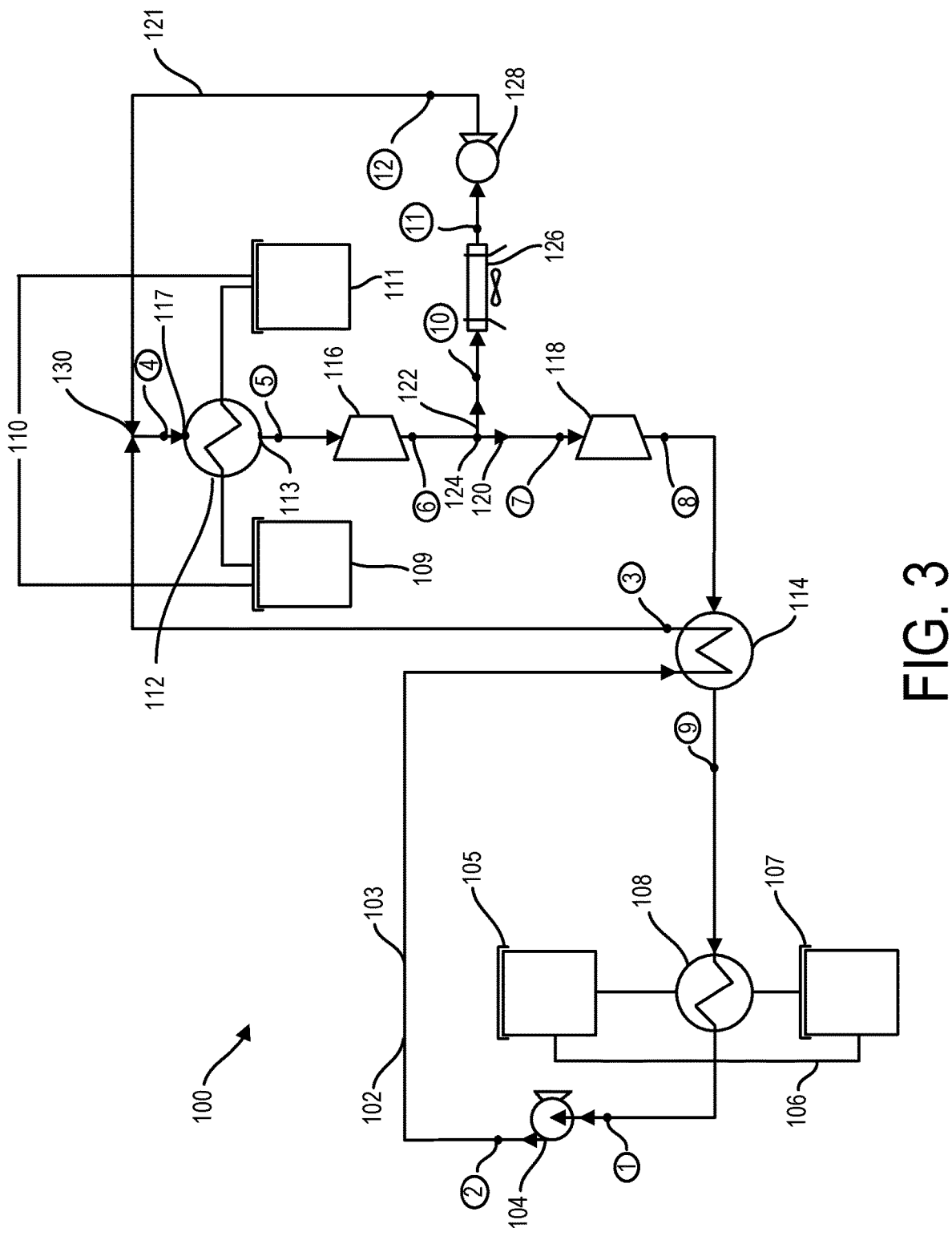
FIG. 3 is a schematic of a generating system of the PTES system shown in FIG. 1, according to one or more embodiments disclosed.

FIG. 3 is a schematic of the generating system 100 of the PTES system 18, according to one or more embodiments disclosed. FIG. 3 depicts different states of the first working fluid 102 in the first fluid circuit 103 during the generating cycle 202, shown in FIG. 2, and in an auxiliary flow path 204 of the generating cycle 202, which are indicated with circled reference numbers. These reference numbers correlate to the numbers shown in FIG. 2, which depicts a pressure-enthalpy diagram for the different cycles of operation of the PTES system 18, according to one or more embodiments.

Referring to FIG. 2 and FIG. 3, collectively, in the generating cycle 202 of operation, the PTES system 18 may transfer thermal energy transfer from the first heat exchanger 112 to generate electricity from the PTES system 18. The generating system 100 of the PTES system 18 may include a first pump 104 to circulate the first working fluid 102 through the first fluid circuit 103 of the PTES system 18. The first pump 104 may use electrical energy to perform work. The first pump 104 may be a reversible pump. The first pump 104 may be fluidly connected to the first heat exchanger 112 and the second heat exchanger 108. The first pump 104 may facilitate the transfer of thermal energy between the high temperature reservoir 110 and the first working fluid 102 via the first heat exchanger 112, and the first pump 104 may facilitate the transfer of thermal energy between the low temperature reservoir 106 and the first working fluid 102 via the second heat exchanger 108.

As shown, with reference to FIG. 2, and FIG. 3, the PTES system 18 may include a recuperator 114 positioned in the first fluid circuit 103 between and in fluid communication with the first pump 104 and the first heat exchanger 112. The recuperator 114 may be in fluid communication with the first pump 104 and the first heat exchanger 112. Prior to discharge from the first pump 104, the first working fluid 102 may be at a first state 1, wherein the temperature and pressure of the first working fluid 102 is low. The first fluid circuit 103 at the first state 1 may be at a first pressure 212 of the first fluid circuit 103 at an inlet of the first pump 104, and the first pressure 212 may be the lowest pressure of the first fluid circuit 103 over the course of one cycle through the first fluid circuit 103. In embodiments, the first pressure 212 may be equal to from about 1.5 MPa to about 4.5 MPa.

After the first working fluid 102 is discharged from the first pump 104, the pressure and temperature of the first working fluid 102 may be increased to a second state 2. The first fluid circuit 103 has a second pressure 216 at an outlet of the first pump 104. The second pressure 216 may be the highest pressure of the first working fluid 102 over the course of one cycle through the first fluid circuit 103. In embodiments, the second pressure 216 may be about equal to from about 25 MPa to about 35 MPa. The temperature of the first working fluid 102 may be further increased as the first working fluid 102 flows through the recuperator 114 resulting in a third state 3 of the first working fluid 102. The first working fluid 102 may enter an inlet 117 of the first heat exchanger 112 at a fourth state 4, and thermal energy may be passed from the high temperature reservoir 110 to the first working fluid 102 to increase the temperature of the first working fluid 102. After exiting an outlet 113 of the first heat exchanger 112, the first working fluid 102 may be in a fifth state 5. During one cycle of the generation cycle 200, the PTES system 18 may exhibit the greatest amount of enthalpy in the fifth state 5.

The generating system 100 may further include a first turbine 116 and a second turbine 118 that may each be fluidly connected to the first fluid circuit 103 and positioned between the first heat exchanger 112 and the recuperator 114. While FIG. 3 depicts the first turbine 116 and the second turbine 118 as separate components, the first turbine 116 and the second turbine 118 may be combined or replaced by a multi-stage turbine, not shown.

In embodiments, the first turbine 116 may be positioned between the first heat exchanger 112 and the second turbine 118. In such embodiments, after the first working fluid 102 exits the first heat exchanger 112, the high temperature first working fluid 102 may be expanded in the first turbine 116, producing shaft work. The expansion of the first working fluid 102 decreases the pressure of the working fluid to a third pressure 214, and the first working fluid 102 may be in a sixth state 6. The third pressure 214 may be greater than the first pressure 212 and less than the second pressure 216. The third pressure 214 may be equal to from about 6 MPa to about 7 MPa. After exiting the first turbine 116 and before entering the second turbine 118, the first working fluid 102 may be separated into a first portion 120 and a second portion 122 at a separation point 124 in the first fluid circuit 103.

After the first working fluid 102 is separated into the first portion 120 and the second portion 122, the first portion 120 is in a seventh state 7. The first portion 120 of the expanded first working fluid 102 may continue to the second turbine 118 where the first working fluid 102 is further expanded, producing additional shaft work. The second expansion of the first working fluid 102 further decreases the pressure of the first working fluid 102, and results in an eighth state 8 of the first working fluid 102. In the eighth state 8, the first working fluid 102 may be at the first pressure 212 and returned to substantially the same pressure as that of the first state 1. The low pressure in the eighth state 8 may be about equal to from about 2 MPa to about 4 MPa. The combined turbine work from the first turbine 116 and the second turbine 118 may exceed the pump work from the generating cycle 202 of operation, and the excess energy may be converted to electrical power by a generator (not shown) and fed into an electrical grid (not shown).

Following the exit from the second turbine 118, the first portion 120 of the first working fluid 102 may flow through the recuperator 114 thereby transferring some of its thermal energy to the other first working fluid 102 passing through the recuperator 114. The first working fluid 102 may be at a ninth state 9 as it flows into the second heat exchanger 108, which may be positioned in the first fluid circuit 103 between the recuperator 114 and the first pump 104. Thermal energy may be transferred from the first working fluid 102 to the low temperature reservoir 106, which returns the first portion 120 of the first working fluid 102 to substantially the first state 1 (both in temperature and pressure) before once again entering the first pump 104. For clarity, it should be noted that the first working fluid 102 includes commingled portions of the first portion 120 and the second portion 122 as the generating cycle repeats.

At the separation point 124 of the first working fluid 102, the second portion 122 of the first working fluid 102 may flow into an auxiliary line 121. The separation point 124 may be positioned between the first turbine 116 and the second turbine 118. The auxiliary line 121 may be positioned between the first turbine 116 and the inlet 117 of the first heat exchanger 112 and may be part of the first fluid circuit 103. The flow of the second portion 122 of the first working fluid 102 through the auxiliary line 121 may define an auxiliary flow path 204 of the PTES system 18. The auxiliary line 121 and the auxiliary flow path 204 may terminate at a combination point 130 that is positioned before an inlet 117 of the first heat exchanger 112. At the combination point 130, the second portion 122 may be combined with the first working fluid 102 such that the first portion 120 and the second portion 122 may be comingled.

In the multi-stage turbine, the first and second portions of the first working fluid 102 may be extracted from the first working fluid 102 through the multi-stage turbine after a first expansion stage and prior to a subsequent expansion stage. The first working fluid 102 may enter an inlet of the multi-stage turbine at the second pressure 212 and the first working fluid 102 may be split into the first portion 120 and the second portion 122 within the multi-stage turbine. The first portion 120 of the first working fluid 102 may be expanded and exit a first outlet of the multi-stage turbine at the first pressure 212 and the second portion 122 of the first working fluid 102 may be expanded and exit a second outlet of the multi-stage turbine at the third pressure 214. Upon exit of the multi-stage turbine, the second portion 122 may flow into the auxiliary line 121 as described herein, and the first portion 120 may flow into the second heat exchanger 108.

The auxiliary line 121 may include a heat rejection heat exchanger 126 and a second pump 128 that are fluidly connected to the first fluid circuit 103 between the first turbine 116 and the first heat exchanger 112. The heat rejection heat exchanger 126 and the second pump 128 may be connected in series.

The second portion 122 of the first working fluid 102 may be in a tenth state 10 after the separation point 124 of the first working fluid 102 and may flow into the heat rejection heat exchanger 126. The second portion 122 may be cooled to near an ambient temperature in the heat rejection heat exchanger 126, resulting in an eleventh state 11 of the first working fluid 102. In one embodiment, the heat rejection heat exchanger 126 may reject the heat to the environment. 'Near an ambient temperature' may include a fluid temperature in the range of about zero to about 10 degrees Celsius (10 C), about zero to about 20 C, about zero to about 30 C, or a lower or higher temperature differential, of the temperature of the surrounding environment.

The heat rejected by the heat rejection heat exchanger 126 may eliminate excess heat in the PTES system that was created due to irreversible thermodynamic process during the charging cycle 200 and the generating cycle 202. The combination of the third pressure 214 and lower temperature may result in a high-density fluid state at an outlet of the heat rejection heat exchanger 126. Because the heat rejection process of the heat rejection heat exchanger 126 may be decoupled from the recuperator 114 via the auxiliary flow path 204, a greater amount of residual enthalpy may be recovered by the PTES system 18. After the second portion 122 exits the heat rejection heat exchanger 126, the second portion 122 may enter the second pump 128 where the pressure of the second portion 122 of the working fluid may be increased to the second pressure 216. Because the second portion 122 is in a high-density fluid state, the work required to raise the pressure of the second portion 122 may be significantly reduced. After the second portion 122 of the working fluid exits the second pump 128, the second portion is at a twelfth state 12, which may be close to that of the third state 3. Therefore, the second portion 122 may be combined with the first working fluid 102 at the combination point 130. The combined first working fluid 102 may result in the fourth state 4.

Figure 4:
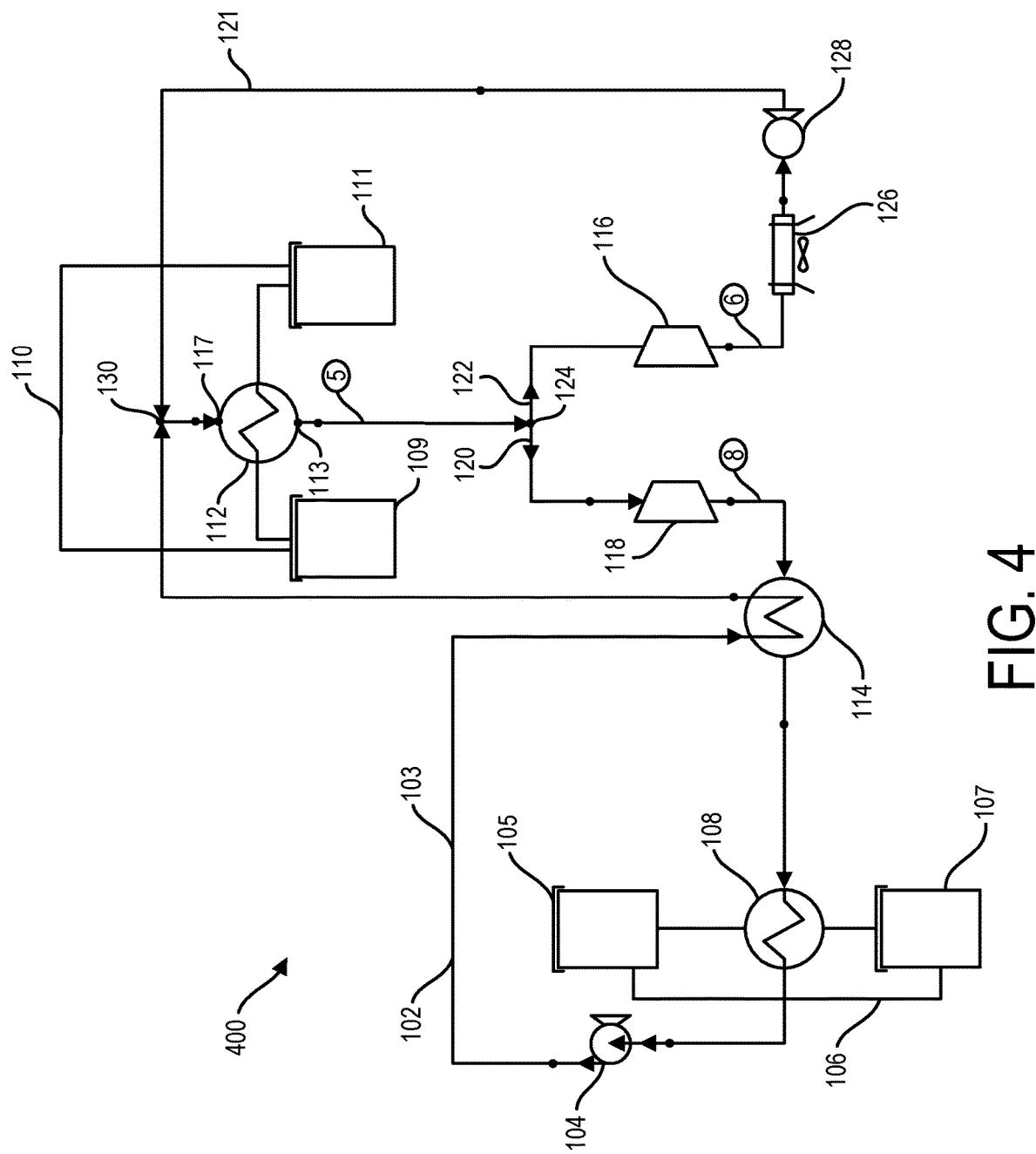
FIG. 4 is a schematic of an alternative example generating system of the PTES system shown in FIG. 1, according to one or more embodiments disclosed.

FIG. 4 is a schematic of an alternative example generating system 400 of the PTES system 18 shown in FIG. 1, according to one or more embodiments disclosed. The generating system 400 may include the first turbine 116 and the second turbine 118 that are positioned in separate fluid lines. The first working fluid 102 may be split into a first portion 120 and a second portion 122 after discharge from the first heat exchanger 112 and before entering the first turbine 116 and the second turbine 118. The first turbine 116 may be positioned between the first heat exchanger 112 and a heat rejection heat exchanger 126, and the second turbine 118 may be positioned between the first heat exchanger 112 and the recuperator 114. The first portion 120 of the first working fluid 102 may enter the second turbine 118 and may expand from the fifth state 5 to the eighth state 8, resulting in the first pressure 212. The second portion 122 of the first working fluid 102 may enter the first turbine 116 and expand the second portion 122 from the fifth state 5 to a sixth state 6, resulting in a third pressure 214. As discussed with respect to the generating system 100, the third pressure 214 is a pressure between a second pressure 216 and the first pressure 212. The generating system 400 may otherwise function in a substantially similar manner to the generating system 100 in FIG. 2.

Figure 5:
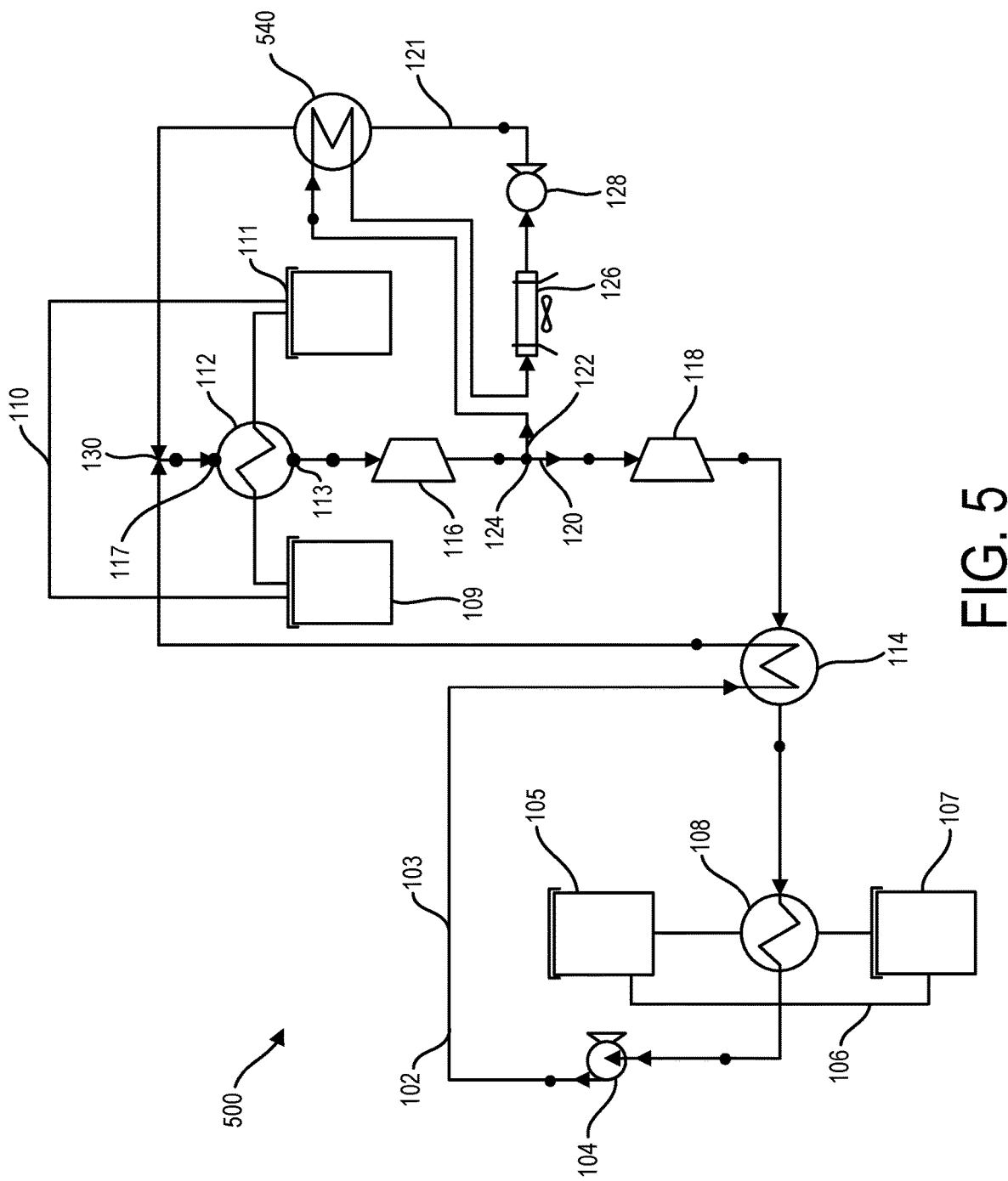
FIG. 5 is a schematic of another alternative example generating system of the PTES system shown in FIG. 1, according to one or more embodiments disclosed.

FIG. 5 is a schematic of another alternative example generating system 500 of the PTES system 18 shown in FIG. 1, according to one or more embodiments disclosed. The generating system 500 may include an auxiliary recuperator 540 fluidly connected to the first fluid circuit 103, and positioned in the auxiliary line 121 between the first turbine 116 and the heat rejection heat exchanger 126. The auxiliary recuperator 540 may also be positioned between the second pump 128 and the first heat exchanger 112 of the first fluid circuit 103. In this example, after the first working fluid 102 splits into the first portion 420 and the second portion 122 within the first fluid circuit 103, the second portion 122 may flow into the auxiliary recuperator 540 and remove thermal energy from the second portion 122 of first working fluid 102. The second portion 122 may further proceed to the heat rejection heat exchanger 126 and the second pump 128, as in the generating system 100 of FIG. 2. However, once the second portion 122 of the first working fluid 102 exits the second pump 128, the second portion 122 may flow through the auxiliary recuperator 540 where the second portion 122 of first working fluid 102 may receive thermal energy before combining with the first working fluid 102 at a combination point 130. In this configuration, residual enthalpy following expansion in the first turbine 116 may be used to preheat the second portion 122 of the first working fluid 102 by means of the auxiliary recuperator 540.

Figure 6:
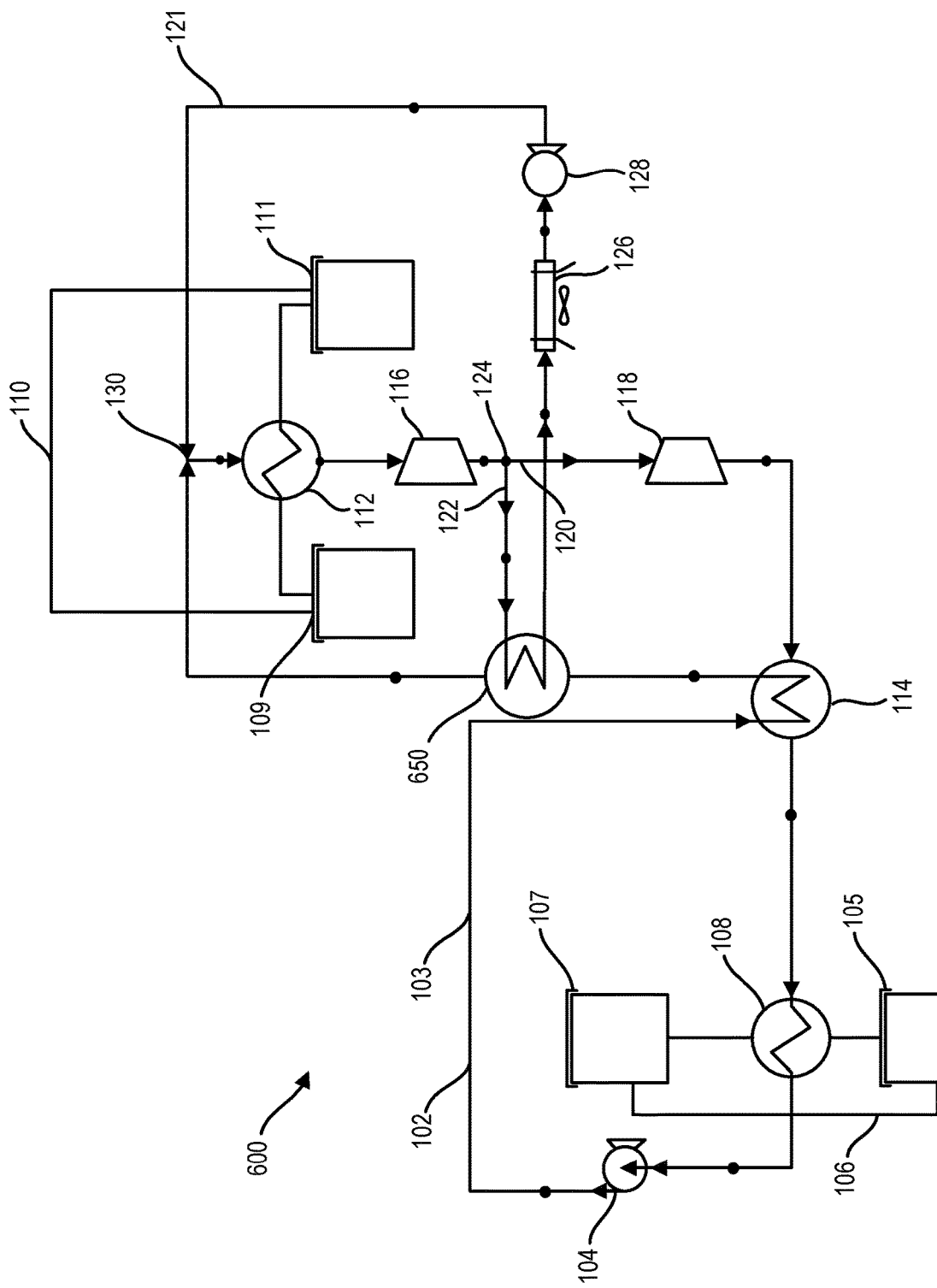
FIG. 6 is a schematic of another alternative example generating system of the PTES system shown in FIG. 1, according to one or more embodiments disclosed.

FIG. 6 is a schematic of another alternative example generating system 600 of the PTES system 18 shown in FIG. 1, according to one or more embodiments disclosed. The generating system 600 may include a second recuperator 650 fluidly connected in the first fluid circuit 103 and positioned between the first recuperator 114 and the first heat exchanger 112. The second recuperator 650 may further be positioned between the first turbine 116 and the heat rejection heat exchanger 126 in the auxiliary line 121. The first working fluid 102 in the generating system 600 may include a temperature increase in both the first recuperator 114 and the second recuperator 650 before the first working fluid 102 enters the first heat exchanger 112. Accordingly, residual enthalpy from the expansion in the first turbine 116 may be used to preheat the first working fluid 102. In addition, after the first working fluid 102 splits into the first portion 120 and the second portion 122, the second portion 122 may reduce its temperature and enthalpy prior to entering the heat rejection heat exchanger 126, further decreasing the work of the second pump 128 that may be used to raise the pressure of the second portion 122 of the first working fluid 102 to the second pressure 216 of the first fluid circuit 103.

Figure 7:
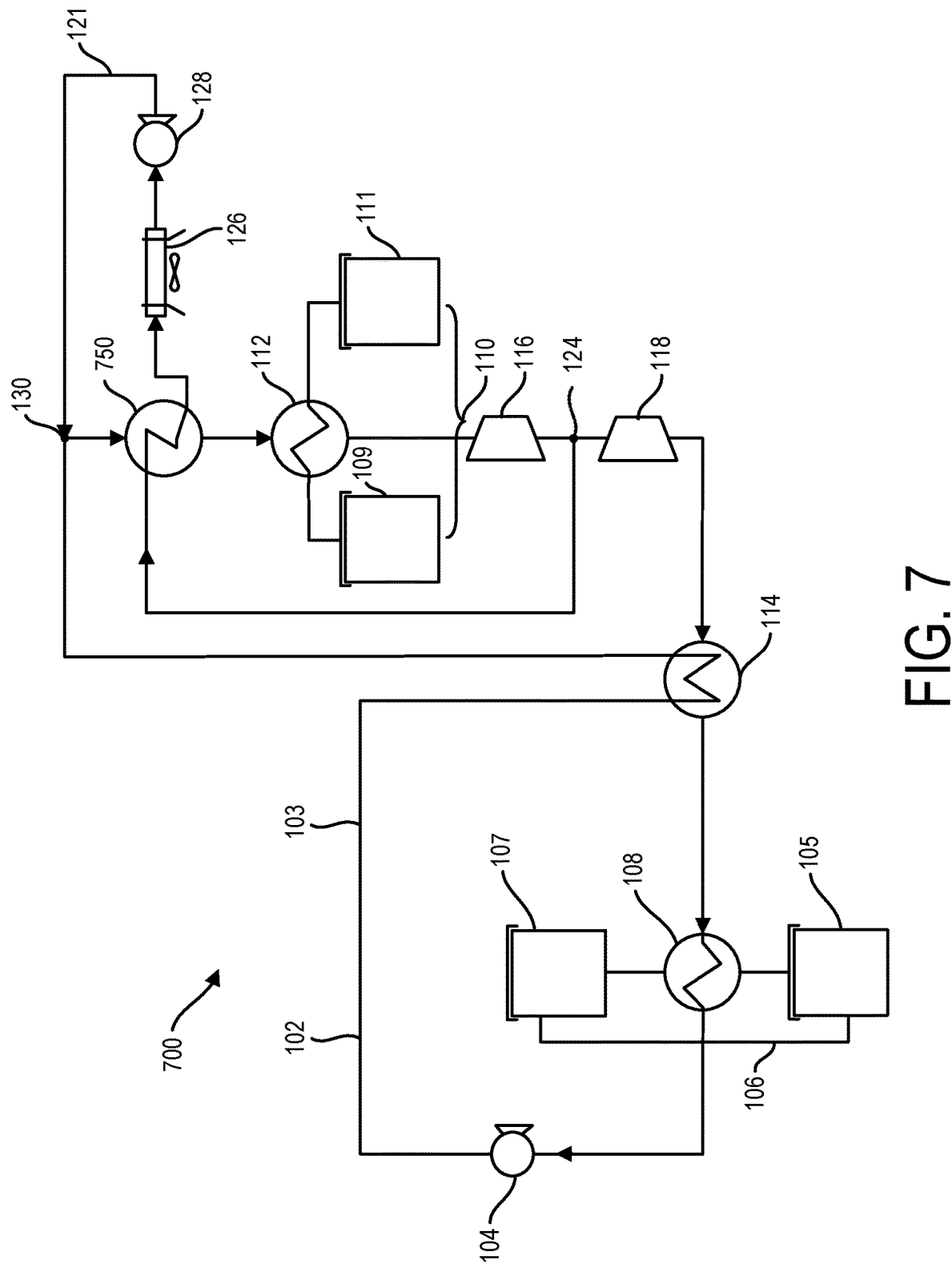
FIG. 7 is a schematic of another alternative example generating system of the PTES system shown in FIG. 1, according to one or more embodiments disclosed.

FIG. 7 is a schematic of another alternative example generating system 700 of the PTES system 18 shown in FIG. 1, according to one or more embodiments disclosed. The generating system 700 may include a second recuperator 750 fluidly connected in the first fluid circuit 103 and positioned between the second pump 128 and the first heat exchanger 612. More specifically, the second recuperator 750 may be positioned between the combination point 130, where the second portion 122 is combined with the first working fluid 102, and the first heat exchanger 112. The first working fluid 102 in the generating system 700 may include a temperature increase in both the first recuperator 114 and the second recuperator 750 before the first working fluid 102 enters the first heat exchanger 112. Accordingly, residual enthalpy from the expansion of the expansion in the first turbine 116 may be used to preheat the first working fluid 102. In addition, after the first working fluid 102 splits into the first portion 120 and the second portion 122, the second portion 122 may reduce its temperature and enthalpy prior to entering the heat rejection heat exchanger 126, further decreasing the work of the second pump 128 that may be required to raise the pressure of the second portion 122 of the first working fluid 102 back to the second pressure 216 of the first fluid circuit 103.

As discussed earlier, one metric of overall cycle performance of PTES systems is round-trip efficiency ("RTE"). The RTE may be defined as the amount of electrical energy that can be produced during one cycle of a generating cycle of a PTES system divided by the amount of electrical energy that was consumed during one cycle of a charging cycle of a PTES system. In each of the PTES systems with generating systems 100, 400, 500, 600, and 700 described above, the RTE may be improved in comparison to traditional PTES systems and a greater amount of electricity from the PTES systems may be recovered. While traditional PTES systems usually have an estimated RTE of 55-56%, the PTES systems with generating systems 100, 400, 500, 600, and 700 disclosed herein may result in an estimated RTE of about 56% to about 60% or about 56% to about 62%.

Figure 8:
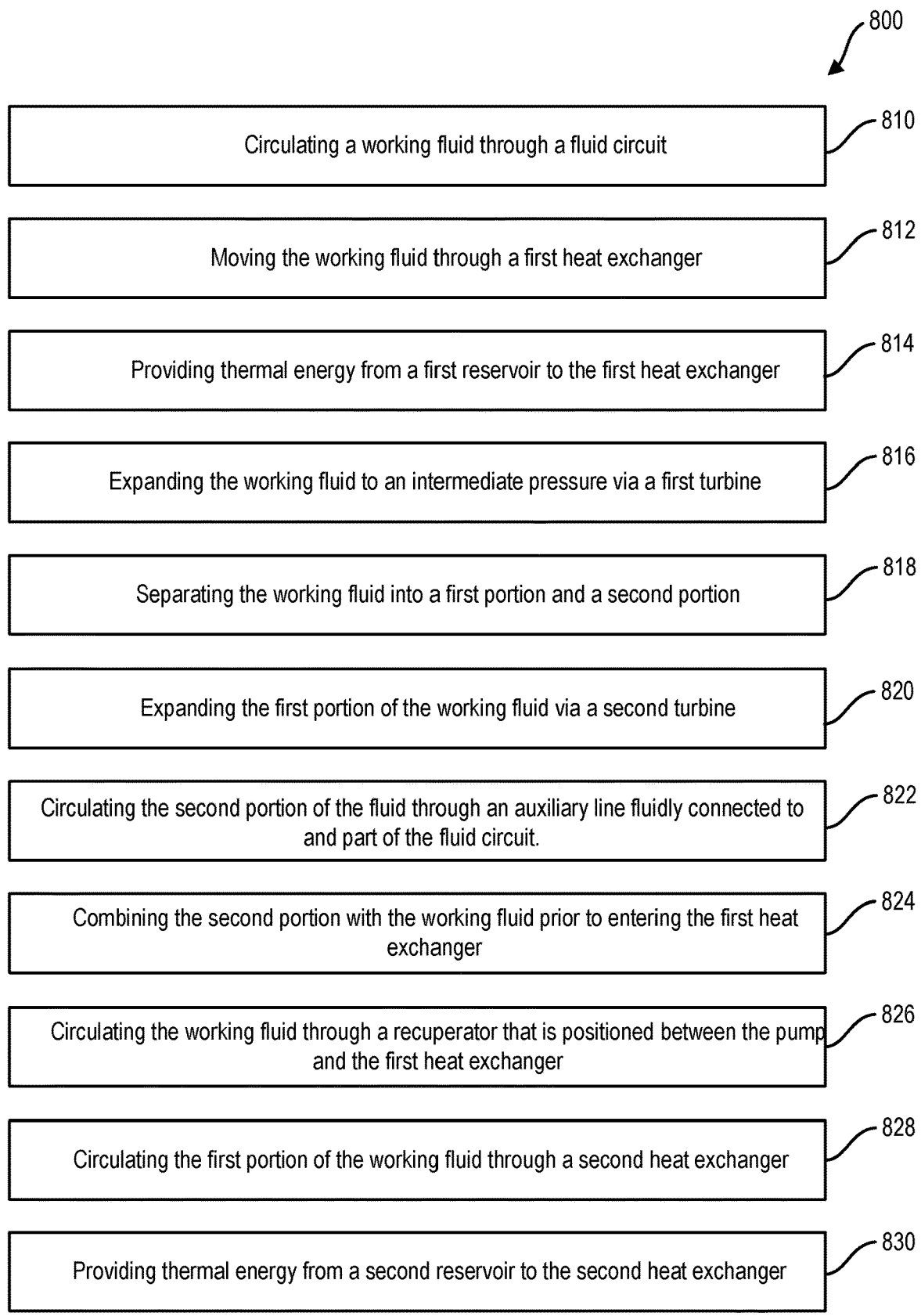
FIG. 8 is a flowchart depicting a method for generating electricity in a PTES system, according to one or more embodiments disclosed.

FIG. 8 is a flowchart depicting a method 800 for generating electricity in a PTES system, according to one or more embodiments disclosed. In 810, the method 800 may include circulating a working fluid through a fluid circuit. The fluid circuit may include a first heat exchanger and a second heat exchanger connected thereto. A pump may be used therewith to pump the fluid therethrough. The pump may increase the pressure of the working fluid.

In 812, the method 800 may include circulating the working fluid through the first heat exchanger. The working fluid may be circulated by the pump. The pump may increase the pressure of the working fluid from a first pressure to a second pressure.

In 814, the method 800 may include providing thermal energy from a high temperature reservoir to the first heat exchanger to facilitate thermal energy transfer with the working fluid. Accordingly, as the working fluid moves through the first heat exchanger, the thermal energy of the working fluid may be increased.

In 816, the method 800 may include expanding the working fluid from the second pressure to a third or intermediate pressure via a first turbine fluidly connected to the fluid circuit. The first turbine may be positioned between the first heat exchanger and the second heat exchanger of the fluid circuit. The first turbine may be a multi-stage turbine and the working fluid may be expanded from the second pressure to the third pressure via a first stage of the multi-stage turbine.

In 818, the method 800 may include separating the working fluid into a first portion and a second portion after flowing the working fluid through the first heat exchanger. The working fluid may be separated into the first portion and the second portion after the working fluid is expanded in the first turbine.

In 820, the method 800 may include expanding the first portion of the working fluid via a second turbine, or a second stage of the multi-stage turbine, such that the first portion of the working fluid may have a pressure about equal to the first pressure. The second turbine may be positioned between the first heat exchanger and the second heat exchanger. The second turbine may be positioned between the first turbine and the second heat exchanger In 822, the method 800 may include circulating the second portion of the working fluid through an auxiliary line fluidly connected to and part of the fluid circuit. The auxiliary line may include a heat rejection heat exchanger configured to reduce the thermal energy of the second portion of the working fluid, and a second pump configured to increase the pressure of the second portion of the working fluid. In 824, the method 800 may include combining the second portion with the working fluid at a combination point upstream of the first heat exchanger. The combination point may be positioned between the pump and the first heat exchanger.

In 826, the method 800 may include circulating the working fluid through a recuperator that is positioned between the pump and the first heat exchanger. In 828, the method 800 may include circulating the first portion of the working fluid through a second heat exchanger fluidly connected within the fluid circuit. In 830 the method 800 may include providing thermal energy from a low temperature reservoir to the second heat exchanger to facilitate thermal energy transfer with the working fluid, thereby decreasing thermal energy of the second portion of the working fluid.

The present disclosure further relates to any one or more of the following numbered embodiments:

1. A generation system in a pumped thermal energy storage ("PTES") system, comprising: a fluid circuit for the circulation of a working fluid therethrough, the working fluid comprising a first portion and a second portion comingled together, the fluid circuit comprising: a pump to circulate the working fluid within the fluid circuit, wherein the working fluid enters the pump at a first pressure, and the working fluid exits the pump at a second pressure, a first heat exchanger through which the working fluid circulates in use, a second heat exchanger through which the working fluid circulates in use, a turbine positioned between the first heat exchanger and the second heat exchanger, the turbine for expanding the working fluid to a third pressure, the third pressure greater than the first pressure and less than the second pressure, a separation location where the working fluid is separated into the first portion and the second portion, an auxiliary line through which the second portion of the working fluid circulates between the turbine and the first heat exchanger, a heat rejection heat exchanger positioned between an outlet of the turbine and an inlet of the first heat exchanger, and in fluid communication with the auxiliary line, wherein the heat rejection heat exchanger for removing thermal energy from the second portion of the working fluid; a high temperature reservoir connected to the first heat exchanger for transferring thermal energy to and from the working fluid; and a low temperature reservoir connected to the second heat exchanger for transferring thermal energy to and from the working fluid.

2. The generation system of embodiment 1, wherein the turbine is a first turbine and further comprising: a second turbine, wherein the first turbine is for expanding the working fluid to a third pressure, the third pressure greater than the first pressure and less than the second pressure; the second turbine is for expanding the first portion of the working fluid to the first pressure; and the heat rejection heat exchanger is positioned between an outlet of the first turbine and an inlet of the first heat exchanger.

3. The generation system of embodiments 1 or 2, wherein the working fluid is split into the first portion and the second portion after exiting the first heat exchanger and prior to entering the first turbine.

4. The generation system according to any embodiment 1 to 3, wherein the working fluid is split into the first portion and the second portion after exiting the first turbine.

5. The generation system according to any embodiment 1 to 4, wherein the first portion and the second portion of the working fluid are combined at a location in the fluid circuit between the pump and the first heat exchanger.

6. The generation system according to any embodiment 1 to 5, wherein the heat rejection heat exchanger decreases the temperature of the second portion to within about zero to about 10 C of an ambient temperature of a surrounding environment.

7. The generation system according to any embodiment 1 to 6, wherein the fluid circuit further includes a second pump positioned between the heat rejection heat exchanger and the first heat exchanger, the second pump is for increasing the pressure of the second portion of the working fluid to the second pressure.

8. The generation system according to any embodiment 1 to 7, wherein the fluid circuit includes a recuperator positioned between the second turbine and the second heat exchanger.

9. The generation system according to any embodiment 1 to 8, wherein the heat rejection heat exchanger transfers the thermal energy to a surrounding environment.

10. A generation system in a pumped thermal energy storage ("PTES") system, comprising: a fluid circuit for circulating a working fluid therethrough, the working fluid comprising a first portion and a second portion comingled together, the fluid circuit comprising: a pump to circulate the working fluid within the fluid circuit, wherein the working fluid enters the pump at a first pressure, and the working fluid exits the pump at a second pressure; a first heat exchanger through which the working fluid circulates in use; a second heat exchanger through which the working fluid circulates in use; a first turbine positioned between the first heat exchanger and the second heat exchanger and wherein the first turbine is for expanding the working fluid to a third pressure, the third pressure greater than the first pressure and less than the second pressure; a separation location where the working fluid is separated into the first portion and the second portion, a second turbine positioned between the first heat exchanger and the second heat exchanger and wherein the second turbine if for expanding the first portion of the working fluid to the first pressure; and an auxiliary line positioned between the first turbine and an inlet of the first heat exchanger wherein the auxiliary line is for removing thermal energy from the second portion of the working fluid and increasing a pressure of the second portion of the working fluid; a high temperature reservoir connected to the first heat exchanger for transferring thermal energy to and from the working fluid; and a low temperature reservoir connected to the second heat exchanger for transferring thermal energy to and from the working fluid.

11. The generation system of embodiment 10, wherein the fluid circuit includes a heat rejection heat exchanger for removing the thermal energy from the second portion of the working fluid.

12. The generation system of embodiments 10 or 11, wherein the heat rejection heat exchanger decreases the temperature of the second portion of the working fluid to within zero to 10 C of an ambient temperature of a surrounding environment.

13. The generation system of any embodiment 10 to 12, wherein the heat rejection heat exchanger releases the thermal energy of the second portion of the working fluid to the surrounding environment.

14. The generation system according to any embodiment 10 to 13, wherein the auxiliary line includes a second pump positioned between the heat rejection heat exchanger and the first heat exchanger, the second pump for increasing the pressure of the second portion of the working fluid.

15. The generation system according to any embodiment 10 to 14, wherein the auxiliary line includes an auxiliary recuperator positioned between the first turbine and the heat rejection heat exchanger; and wherein the auxiliary recuperator is for reducing the thermal energy of the second portion of the working fluid.

16. The generation system according to any embodiment 10 to 15, wherein the fluid circuit includes a recuperator positioned between the second turbine and the second heat exchanger.

17. The generation system according to any embodiment 10 to 16, wherein thermal energy is removed from the first portion of the working fluid in the second heat exchanger.

18. A method for generating electricity in a pumped thermal energy system, comprising: circulating a working fluid, comprising a first portion and a second portion comingled together, through a fluid circuit via a first pump, wherein the working fluid enters the pump at a first pressure and exits the pump at a second pressure, the second pressure greater than the first pressure; circulating the working fluid through a first heat exchanger fluidly connected to the pump within the fluid circuit; expanding the working fluid to a third pressure via a turbine positioned in the fluid circuit between the first heat exchanger and a second heat exchanger, the third pressure greater than the first pressure and less than the second pressure; separating the working fluid into the first portion and the second portion after expansion to the third pressure; expanding the first portion of the working fluid via the turbine to the first pressure; circulating the second portion of the working fluid through an auxiliary line fluidly connected to and part of the fluid circuit, wherein the auxiliary line comprises a heat rejection heat exchanger for reducing the thermal energy of the second portion of the working fluid; circulating the second portion of the working fluid within the auxiliary line through a second pump, fluidly connected to and part of the auxiliary line, the second pump for increasing the pressure of the second portion of the working fluid to the second pressure; circulating the first portion of the working fluid through the second heat exchanger fluidly connected within the fluid circuit; and combining the second portion with the first portion between the first pump and the first heat exchanger.

19. The method of embodiment 18, further comprising circulating the working fluid through a recuperator that is positioned in the fluid circuit between the pump and the heat exchanger.

20. The method of embodiments 18 or 19, further comprising: providing thermal energy from a high temperature reservoir to the first heat exchanger to facilitate thermal energy transfer with the working fluid; providing thermal energy from a low temperature reservoir to the second heat exchanger to facilitate thermal energy transfer with the working fluid; and wherein the turbine comprises a first turbine and a second turbine.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

The invention claimed is:

1. A generation system in a pumped thermal energy storage ("PTES") system, comprising:
    a fluid circuit for the circulation of a working fluid therethrough, the working fluid comprising a first portion and a second portion comingled together, the fluid circuit comprising:
        a pump to circulate the working fluid within the fluid circuit, wherein the working fluid enters the pump at a first pressure, and the working fluid exits the pump at a second pressure,
        a first heat exchanger through which the working fluid circulates in use,
        a second heat exchanger through which the working fluid circulates in use,
        a turbine positioned between the first heat exchanger and the second heat exchanger, the turbine for expanding the working fluid to a third pressure, the third pressure greater than the first pressure and less than the second pressure,
        a separation location where the working fluid is separated into the first portion and the second portion,
        an auxiliary line through which the second portion of the working fluid circulates between the turbine and the first heat exchanger, and
        a heat rejection heat exchanger positioned between an outlet of the turbine and an inlet of the first heat exchanger, and in fluid communication with the auxiliary line, wherein the heat rejection heat exchanger for removing thermal energy from the second portion of the working fluid;
    a high temperature reservoir connected to the first heat exchanger for transferring thermal energy to and from the working fluid; and
    a low temperature reservoir connected to the second heat exchanger for transferring thermal energy to and from the working fluid.

2. The generation system of claim 1, wherein the turbine is a first turbine and further comprising:
    a second turbine,
    wherein the first turbine is for expanding the working fluid to a third pressure, the third pressure greater than the first pressure and less than the second pressure;
    the second turbine is for expanding the first portion of the working fluid to the first pressure; and
    the heat rejection heat exchanger is positioned between an outlet of the first turbine and an inlet of the first heat exchanger.

3. The generation system of claim 2, wherein the working fluid is split into the first portion and the second portion after exiting the first heat exchanger and prior to entering the first turbine.

4. The generation system of claim 2, wherein the working fluid is split into the first portion and the second portion after exiting the first turbine, before entering the second turbine, and before entering the heat rejection heat exchanger.

5. The generation system of claim 2, wherein the first portion and the second portion of the working fluid are combined at a location in the fluid circuit between the pump and the first heat exchanger.

6. The generation system of claim 1, wherein the heat rejection heat exchanger decreases the temperature of the second portion to within about zero to about 10C of an ambient temperature of a surrounding environment.

7. The generation system of claim 1, wherein the fluid circuit further includes a second pump positioned between the heat rejection heat exchanger and the first heat exchanger, the second pump is for increasing the pressure of the second portion of the working fluid to the second pressure.

8. The generation system of claim 1, wherein the turbine is a first turbine and the fluid circuit further includes:
    a second turbine; and
    a recuperator positioned between the second turbine and the second heat exchanger.

9. The generation system of claim 1, wherein the heat rejection heat exchanger transfers the thermal energy to a surrounding environment.

10. A generation system in a pumped thermal energy storage ("PTES") system, comprising:
    a fluid circuit for circulating a working fluid therethrough, the working fluid comprising a first portion and a second portion comingled together, the fluid circuit comprising:
        a pump to circulate the working fluid within the fluid circuit, wherein the working fluid enters the pump at a first pressure, and the working fluid exits the pump at a second pressure;
        a first heat exchanger through which the working fluid circulates in use;
        a second heat exchanger through which the working fluid circulates in use;
        a first turbine positioned between the first heat exchanger and the second heat exchanger and wherein the first turbine is for expanding the working fluid to a third pressure, the third pressure greater than the first pressure and less than the second pressure;
        a separation location where the working fluid is separated into the first portion and the second portion,
        a second turbine positioned between the first heat exchanger and the second heat exchanger and wherein the second turbine is for expanding the first portion of the working fluid to the first pressure; and an auxiliary line positioned between the first turbine and an inlet of the first heat exchanger wherein the auxiliary line is for removing thermal energy from the second portion of the working fluid and increasing a pressure of the second portion of the working fluid;

a high temperature reservoir connected to the first heat exchanger for transferring thermal energy to and from the working fluid; and a low temperature reservoir connected to the second heat exchanger for transferring thermal energy to and from the working fluid.

11. The generation system of claim 10, wherein the fluid circuit includes a heat rejection heat exchanger for removing the thermal energy from the second portion of the working fluid.

12. The generation system of claim 11, wherein the heat rejection heat exchanger decreases the temperature of the second portion of the working fluid to within zero to 10C of an ambient temperature of a surrounding environment.

13. The generation system of claim 11, wherein the heat rejection heat exchanger releases the thermal energy of the second portion of the working fluid to the surrounding environment.

14. The generation system of claim 11, wherein the auxiliary line includes a second pump positioned between the heat rejection heat exchanger and the first heat exchanger, the second pump for increasing the pressure of the second portion of the working fluid.

15. The generation system of claim 11, wherein the auxiliary line includes an auxiliary recuperator positioned between the first turbine and the heat rejection heat exchanger; and wherein the auxiliary recuperator is for reducing the thermal energy of the second portion of the working fluid.

16. The generation system of claim 10, wherein the fluid circuit includes a recuperator positioned between the second turbine and the second heat exchanger.

17. The generation system of claim 10, wherein thermal energy is removed from the first portion of the working fluid in the second heat exchanger.

18. The generation system of claim 10, wherein the working fluid is split into the first portion and the second portion after exiting the first heat exchanger and prior to entering the first turbine.

19. The generation system of claim 10, wherein the working fluid is separated into the first portion and the second portion after exiting the first turbine, before entering the second turbine, and before entering the heat rejection heat exchanger.

20. A method for generating electricity in a pumped thermal energy system, comprising:

circulating a working fluid, comprising a first portion and a second portion comingled together, through a fluid circuit via a first pump, wherein the working fluid enters the pump at a first pressure and exits the pump at a second pressure, the second pressure greater than the first pressure;

circulating the working fluid through a first heat exchanger fluidly connected to the pump within the fluid circuit;

expanding the working fluid to a third pressure via a first turbine positioned in the fluid circuit between the first heat exchanger and a second heat exchanger, the third pressure greater than the first pressure and less than the second pressure;

separating the working fluid into the first portion and the second portion after expansion to the third pressure;

expanding the first portion of the working fluid via a second turbine to the first pressure;

circulating the second portion of the working fluid through an auxiliary line fluidly connected to and part of the fluid circuit, wherein the auxiliary line comprises a heat rejection heat exchanger for reducing the thermal energy of the second portion of the working fluid;

circulating the second portion of the working fluid within the auxiliary line through a second pump, fluidly connected to and part of the auxiliary line, the second pump for increasing the pressure of the second portion of the working fluid to the second pressure;

circulating the first portion of the working fluid through the second heat exchanger fluidly connected within the fluid circuit; and combining the second portion with the first portion between the first pump and the first heat exchanger.

21. The method of claim 20, further comprising circulating the working fluid through a recuperator that is positioned in the fluid circuit between the pump and the heat exchanger.

22. The method of claim 20, further comprising:

providing thermal energy from a high temperature reservoir to the first heat exchanger to facilitate thermal energy transfer with the working fluid;

providing thermal energy from a low temperature reservoir to the second heat exchanger to facilitate thermal energy transfer with the working fluid; and wherein the turbine comprises a first turbine and a second turbine.

* * * * *